Patented Mar. 28, 1950

2,502,120

UNITED STATES PATENT OFFICE 2,502,120

REMOVAL OF SILICON COMPOUNDS FROM WATER

William C. Bauman, Midland, Mich., assignor to The Dow Chemical Company, Midland, Mich., a corporation of Delaware No Drawing. Application July 17, 1944, Serial No. 545,389

9 Claims. (Cl. 210—24)

This invention concerns a method of treating water to purify the same. It particularly concerns the removal of dissolved silicon compounds from water.

It is known that water may be softened by passage through a bed of a cation exchange agent and that it may be freed of most dissolved salts, alkalies, or acids by passage through a series of beds, at least one of which is a bed of a cation exchange agent and another a bed of an anion exchange agent. However, natural waters, e. g. the waters of rivers, lakes, or wells, usually contain a small, but significant, amount of dissolved silica which presumably is in the form of silicic acid or a metal silicate. Such direct treatment of the water with ion exchange agents does not result in satisfactory removal of the dissolved silica.

For certain purposes, e. g. for use in high-pressure boilers, it is important that the dissolved silicon compounds be removed as completely as possible.

I have now found that the soluble silicon compounds often present in water may be removed readily and nearly completely by treating the water with sufficient hydrogen fluoride to convert the silicon compounds to fluosilicic acid and passing the water over an anion exchange agent which absorbs the fluosilicic acid and removes it from the water. I have also found that such operations of removing dissolved silicon compounds from water may advantageously be combined with operations for removing other dissolved ions, particularly cations, from the water to effect substantially complete purification of the latter. I also have discovered satisfactory procedures for regenerating the anion exchange agent to free the same of the absorbed silicon compounds and condition it for re-employment in the process.

In order effectively to remove dissolved silicon compounds from water in accordance with the invention, it is merely necessary to introduce into the water sufficient hydrofluoric acid to convert dissolved silicon compounds into fluosilicic acid and thereafter to pass the resultant solution over an anion exchange agent. The reactions involved may be illustrated by the equations:

(1) 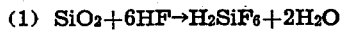

(2) 

wherein R represents a resin radical to which the —$NH_2$ group is attached. A variety of anion exchange agents which may be used for the purpose are well known to the art. In most instances such anion exchange agents are water-insoluble organic resins containing amino groups, but certain other anion exchange agents which are satisfactory for the purpose are also known. Examples of suitable anion exchange agents are resinous meta-phenylenediamine and formaldehyde condensation products; resinous condensation products of phenol, formaldehyde and poly-alkylenepolyamines; and resinous condensation products of aliphatic amines, aldehydes and ketones; etc.

It is important that the water, containing the fluosilicic acid, be somewhat acidic at the time when it is fed into the bed of the anion exchange agent, not merely in order to avoid conversion of the fluosilicic acid into a salt thereof, since such salt is sometimes formed together with the acid under acidic conditions, but because the metal salts of fluosilicic acid tend to decompose into metal fluorides and silicates under alkaline conditions. If this were to occur, satisfactory removal of the silicate by absorption on the anion exchange would not be accomplished, i. e. silicic acid and its salts are not readily absorbed by anion exchange agents. Peculiarly, although the anion exchange agents are basic in the sense of forming salts with acids, they do not cause such decomposition, but, instead, react with the fluosilicic acid to form a stable salt of the latter.

Such steps for converting dissolved silicon compounds into fluosilicic acid and for removing the latter from the water by absorption on an anion exchange agent may be accomplished, even though the water also contains other acids, e. g. hydrochloric or sulphuric acid, or contains soluble salts such as sodium chloride, sodium bromide, potassium chloride, sodium sulphate, magnesium sulphate, etc., but the presence of such other impurities, particularly the salts, is sometimes disadvantageous. Acids other than the fluosilicic acid, if present, are absorbed together with the fluosilicic acid by the anion exchange agent and thereby reduce somewhat the absorptive capacity of the latter for the fluosilicic acid, but they do not otherwise interfere with the process. However, dissolved salts often react with the fluosilicic acid to form another acid, e. g. hydrochloric acid, and a fluosilicate, with establishment of an equilibrium between such reactants and reaction products. In some instances, the anion exchange agent may absorb the acid other than fluosilicic acid as readily, or more readily, than the latter, in which case absorption and removal from the water of the fluosilicic acid may be incomplete. For this reason, dissolved salts are preferably removed from the water prior to passage of the latter over the anion exchange agent. Such removal of salts from the water is conveniently accomplished by passing the water over an acidic cation exchange agent, e. g. the acid form of a zeolite or a water-insoluble sulphonated or carboxylated organic resin, which absorbs metal cations dissolved in the water and replaces them with hydrogen ions.

The step of passing the water through a cation exchange agent to remove dissolved metal cations therefrom may advantageously be combined with that of treating the water with hydrogen fluoride. Thus, by first treating the water with a water-soluble fluoride, such as sodium fluoride, potassium fluoride, or ammonium bifluoride, etc., and passing it through a bed of a cation exchange agent which initially contains free acid radicals, e. g. sulphonic acid or carboxylic acid radicals, the ammonium or metal cations dissolved in the water are observed by the cation exchange agent with resultant conversion of the fluoride into hydrogen fluoride. The latter reacts with the dissolved silicon compounds to form fluosilicic acid. By carrying out the first step of the process in this particular manner, a salt of hydrofluoric acid, instead of the acid itself, may be used as a starting material and considerable economy is effected. Also, any soluble salts initially present in the water are removed and efficient removal of the fluosilicic acid from the water in a subsequent step of the process is rendered more certain. After such passage over a cation exchange agent, the water may be passed over a basic anion exchange agent to effect absorption and removal of the fluosilicic acid and at the same time to neutralize the water and render it substantially pure and suitable for use in high-pressure boilers or for other purposes.

As procedure alternative to that just described, the basic anion exchange agent may initially be treated with hydrofluoric acid to form a hydrofluoride of the same, after which the water from which soluble silicon compounds are to be removed may be passed over the agent. Because of the fact that natural waters, after passage over an acidic cation exchange agent, usually contain, in addition to the dissolved silica, small amounts of acids such as sulphuric acid, hydrochloric acid, etc., it usually is advisable to convert only a portion, e. g. from 5 to 20 per cent, of the basic anion exchange agent to its hydrofluoride. During passage over the mixture of the basic exchange agent and its hydrofluoride, the agent absorbs the soluble silicon compounds and free acids from the water and is itself converted in part to a fluosilicate and in part to salts of the other acids absorbed from the water. The treatment of the basic anion exchange agent with hydrofluoric acid to form its hydrofluoride may be accomplished directly or in other ways. For instance, an aqueous solution of ammonium bifluoride, or a metal fluoride, may be passed successively through a bed of the acidic cation exchange agent and the basic anion exchange agent so as to convert the latter partially into the form of its hydrofluoride. Thereafter, the water to be purified may be passed in series through the same beds to remove soluble silicon compounds and other salts from the water. Such operations for initially converting the anion exchange agent into its hydrofluoride are advantageous in that they avoid the necessity of gradually introducing the hydrofluoric acid or soluble fluoride into the relatively large body of water which is to be freed of silicon compounds.

During use in the process, the anion exchange agent is converted at least in part to its fluosilicate and the cation exchange agent, when employed, is converted to a salt. Periodically, it is necessary that each such agent be regenerated in order to permit continued use of the same. Methods for regenerating cation exchange agents are well known and do not require detailed description. The passage of an aqueous solution of an acid, such as hydrochloric or sulphuric acid, over such agent is sufficient to regenerate the same. The anion exchange agent may similarly be regenerated by treating the same with an aqueous solution of an alkali such as sodium hydroxide, potassium hydroxide, or sodium carbonate, etc. However, such direct treatment with an alkali usually results in only partial and incomplete regeneration of the anion exchange agent, i. e. the soluble fluosilicate which is formed apparently decomposes with formation of a silicate that is retained to a considerable extent in the resin. As a result, the capacity of the regenerated anion exchange agent for the further absorption of fluosilicic acid is considerably lower than that which it initially possessed. I have found that the regeneration may be accomplished more completely by treating the anion exchange agent with an aqueous acid, e. g. hydrochloric or suphuric acid, to displace fluosilicic acid from the anion exchange agent and convert the latter into a salt of the acid used to effect the displacement. If desired, the resultant salt of the anion exchange agent, e. g. the sulphate or hydrochloride of said agent, may be used directly for the further absorption of fluosilicic acid from water. However, such practice results in the introduction of another acid, e. g. sulphuric or hydrochloric acid, into the water and this often is undesirable. Accordingly, after treating the spent anion exchange agent with an acid to remove fluosilicate radicals therefrom and form a different salt of the agent, the latter is preferably treated with a water-soluble basic compound, e. g. ammonia, sodium hydroxide, or sodium carbonate, etc., to decompose the salt and reconvert the anion exchange agent into its basic form. The agent is then in condition for re-employment in the process for the treatment of water to remove dissolved silicon compounds from the latter.

The following example describes one way in which the principle of the invention has been applied, but is not to be construed as limiting the invention:

*Example*

A granular basic anion exchange agent, which consisted of a water-insoluble resinous condensation product of tetra-ethylenepentamine, phenol, and formaldehyde and which was prepared by the method of United States Patent 2,341,907, was treated with sufficient aqueous hydrofluoric acid to convert approximately 15 per cent of said agent to its hydrofluoride. River water, which contained dissolved silicon compounds in amount corresponding to 3 parts by weight of silica per million parts of the water and which also contained appreciable amounts of dissolved salts such as sodium chloride, calcium chloride, etc., was passed first through a bed of an acidic, granular, alkali-insoluble sulphonated phenol-formaldehyde resin, which served as a cation exchange agent, and then through a bed of the above-mentioned anion exchange agent. The water which flowed from the second bed, i. e. the bed of the anion exchange agent, was, in the early stages of the operation, substantially pure and free of silicon compounds. However, the passage of river water through the two beds was continued until the water flowing from the second bed contained silicon compounds in amount corresponding approximately to the initial concentration of such compounds in the river water. In this first stage of the process no attempt was made to determine the amount of water that could be freed of silicon compounds, since it was the absorptive capacity of the anion exchange agent after being generated, rather than when first used, which was of greatest interest. After the anion exchange agent had absorbed its capacity of silicon compounds, the flow of river water was discontinued and an aqueous hydrochloric acid solution of 5 per cent concentration was passed through the two beds. The cation exchange agent was thereby regenerated and the anion exchange agent was rendered nearly free of silicon compounds and converted to its hydrochloride. Regeneration of the anion exchange agent was completed by passing over the same an aqueous ammonium hydroxide solution of 4 per cent concentration. The anion exchange agent was again converted in part to its hydrofluoride after which the passage of river water through the two beds of the ion exchange agents was continued. After flushing the two beds free of the liquors used in regenerating the same, there was obtained as the effluent from the second bed, i. e. the bed of the anion exchange agent, purified water containing silicon compounds in amount corresponding to less than 0.2 part of silica and containing other ionizable salts which, when calculated as being sodium chloride, corresponded to less than 0.2 part of sodium chloride, per million parts of the water. Water of this purity was obtained in amount corresponding to 1,520 gallons of water per cubic foot of the bed of the anion exchange agent before the contents of dissolved silica and other anions in the water flowing from the bed increased quite sharply to approach those of the untreated river water. The amount of dissolved silicon compounds absorbed from the water by the anion exchange agent corresponded to 0.0454 pound of silica per cubic foot of the bed of said agent. When the water flowing from the system had a silicon content corresponding approximately to that of the untreated water, the flow of river water was interrupted and an aqueous hydrochloric acid solution of 5 per cent concentration was passed through the bed of the anion exchange agent. The liquor which flowed from the bed during the latter operation was analyzed and found to contain silicon compounds in amount corresponding to 0.0444 pound of silica per cubic foot of the bed of the anion exchange agent. This corresponded to displacement, from the anion exchange agent, of approximately 98 per cent of the silicon compounds which had been absorbed by the agent.

Other modes of applying the principle of the invention may be employed instead of those described, change being made as regards the method herein disclosed, provided the step or steps stated by any of the following claims or the equivalent of such stated step or steps be employed.

I therefore particularly point out and distinctly claim as my invention:

1. In a method of purifying water which contains dissolved cations and a naturally occurring dissolved silicon compound, the steps of passing the water through a bed of a substantially water-insoluble acidic cation exchange agent and thereafter through a bed comprising a hydrofluoride of a substantially water-insoluble anion exchange agent.

2. In a method of purifying water which contains a naturally occurring dissolved silicon compound, the steps of treating the water with a water-soluble and an ionizable salt of hydrofluoric acid and passing the resultant solution over, and in contact with, a bed of a substantially water-insoluble acidic cation exchange agent and thereafter over, and in contact with, a bed of a substantially water-insoluble anion exchange agent in its basic form.

3. In a method of freeing water of a dissolved silicon compound, the steps of treating water, which contains a dissolved silicon compound but which is substantially free of metal ions, with both a substantially water-insoluble hydrofluoride of an anion exchange agent and a substantially water-insoluble anion exchange agent in its basic form.

4. A process of purifying water which comprises adding to water containing silica and other ionizable solids a quantity of an alkali metal fluoride sufficient to convert substantially all of the silica present to fluosilicic acid, and passing the so-treated water through at least one series of beds of ion active materials comprising, first, a cation exchange material active for the removal of cations from water and, second, an anion exchange material active for the removal of anions from water.

5. In a method of freeing water of dissolved silicon compounds, the step of passing the water through a bed of a substantially water-insoluble anion exchange material comprising a hydrofluoride of an anion exchange agent.

6. In a method of freeing water of dissolved silicon compounds, the steps of treating a substantially water-insoluble basic anion exchange agent with hydrogen fluoride in amount insufficient to convert all of said agent to a hydrofluoride thereof, and thereafter passing the water, containing dissolved silicon compounds, through a bed of the thus-treated anion exchange material.

7. A process of purifying an aqueous fluid which comprises adding to an aqueous fluid containing silica and other ionizable solids a quantity of an alkali metal fluoride sufficient to convert substantially all of the silica present to fluosilicic acid, and passing the so-treated aqueous fluid through at least one series of beds of ion active materials comprising, first, a cation exchange material active for the removal of cations from water and, second, an anion exchange material active for the removal of anions from water.

8. A process of purifying an aqueous fluid which comprises adding to an aqueous fluid containing silica and other ionizable solids a quantity of sodium fluoride sufficient to convert substantially all of the silica present to fluosilicic acid, and passing the so-treated aqueous fluid through at least one series of beds of ion active materials comprising, first, a cation exchange material active for the removal of cations from water and, second, an anion exchange material active for the removal of anions from water.

9. In a method of purifying water which contains a dissolved ionizable salt and also a naturally-occurring dissolved silicon compound, the steps of passing the water through at least one series of beds of ion active materials comprising, first a substantially water-insoluble acidic cation exchange material and, second, a substantially water-insoluble bed of both an anion exchange material in its basic form and a hydrofluoride of said anion exchange material.

WILLIAM C. BAUMAN.

REFERENCES CITED

The following references are of record in the file of this patent:

UNITED STATES PATENTS

| Number | Name | Date |
|---|---|---|
| 404,180 | Doremus | May 28, 1889 |
| 807,412 | Wixford | Dec. 12, 1905 |
| 2,082,491 | Green | June 1, 1937 |
| 2,139,227 | Goetz | Dec. 6, 1938 |
| 2,155,318 | Liebknecht | Apr. 18, 1939 |
| 2,157,509 | Urbain et al. | May 9, 1939 |
| 2,210,966 | Urbain et al. | Aug. 13, 1940 |
| 2,227,432 | Behrman | Jan. 7, 1941 |
| 2,281,194 | Holmes et al. | Apr. 8, 1942 |

Certificate of Correction

Patent No. 2,502,120                                                 March 28, 1950

WILLIAM C. BAUMAN

It is hereby certified that errors appear in the printed specification of the above numbered patent requiring correction as follows:

Column 3, line 20, for the word "observed" read *absorbed*; column 5, line 14, for "generated" read *regenerated*;

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*